United States Patent [19]

Vigerstrom

[11] 3,948,159
[45] Apr. 6, 1976

[54] GRILLING APPARATUS

[75] Inventor: Knut Birger Vigerstrom, Stockholm, Sweden

[73] Assignee: Elektro-Food AB, Stockholm, Sweden

[22] Filed: Mar. 18, 1974

[21] Appl. No.: 452,383

[30] Foreign Application Priority Data
Mar. 16, 1973 Sweden.............................. 7303707

[52] U.S. Cl. ...................... 99/358; 99/374; 99/426; 99/441
[51] Int. Cl.² .................................... H05B 7/09
[58] Field of Search....... 99/358, 349, 372, 376–377, 99/378–379, 381–382, 383–384, 426, 428, 439–440, 441–446, 374

[56] References Cited
UNITED STATES PATENTS

| | | | |
|---|---|---|---|
| 1,490,177 | 4/1924 | Matson ................................ | 99/376 |
| 1,587,788 | 6/1926 | Morley................................. | 99/376 |
| 1,693,784 | 12/1928 | Hollands............................ | 99/374 X |
| 2,044,615 | 6/1936 | Kennedy........................ | 99/441 UX |
| 2,059,133 | 10/1936 | Merritt............................ | 99/374 UX |
| 2,107,931 | 2/1938 | Brown................................ | 99/358 X |
| 2,243,993 | 6/1941 | Watson.......................... | 99/349 UX |
| 3,098,426 | 7/1963 | Lee, Sr. ........................... | 99/358 X |
| 3,167,431 | 1/1965 | Lee, Sr. et al. ...................... | 99/358 |
| 3,311,285 | 3/1967 | Korr................................. | 99/358 X |
| 3,330,203 | 7/1967 | Korr................................. | 99/358 X |
| 3,367,260 | 2/1968 | Freyburger ....................... | 99/374 |
| 3,418,919 | 12/1968 | Nardon............................ | 99/374 X |
| 3,746,837 | 7/1973 | Frey et al......................... | 99/391 X |

*Primary Examiner*—Stanley N. Gilreath
*Assistant Examiner*—Arthur O. Henderson
*Attorney, Agent, or Firm*—Burns, Doane, Swecker & Mathis

[57] ABSTRACT

A grilling apparatus for heating sausages, hamburgers, and the like, has a base and a hinged cover, with heating electrode plates in the base and cover, contoured in accordance with the item of food to be heated. The electrode plates in either the base or cover are resiliently mounted, as by means of springs, so that uniform pressure is applied over the entire surface of the item of food being heated to insure uniform cooking. The apparatus is of modular design so that different electrodes or combination of electrodes may be inserted according to the food items to be heated. Spring strength is selected to apply optimum pressure during cooking of the various foods. A timer and voltage regulator are provided to control duration and temperature of cooking.

2 Claims, 3 Drawing Figures

GRILLING APPARATUS

The present invention relates to an apparatus for grilling of for example sausages, hamburgers, rissoles etc., said apparatus comprising a base and a cover, which can be closed on said base, and electrodes arranged as well on the base as in the cover for heating the food to be grilled.

In known apparatuses of this kind, a link is located for example on each side of the cover, one end of said link being mounted in the base and the other end forming a handle for their turning and said links carrying the cover by one horisontal rotation shaft located at the middle of the length of the cover and mounted in the links, so that the cover is adjustable over the food to be grilled. However, the adjustment relative to the food to be grilled, especially when several pieces of food are located on the base, is very dissatisfying, as the cover can only turn around a horisontal rotation shaft and the grilling will not be uniform.

It is an object of the present invention to provide such a grill, that said disadvantages are avoided and that a uniform grilling of the food is achieved without burning the food.

This is attained in an apparatus comprising a base and a turnable cover and electrodes on said base and cover and current supply with an adjustable voltage according to the invention by the fact that as well the base as the cover have preferably several electrode plates, and that the electrode plates in the cover or on the base are individually movably arranged and individually weight or spring loaded for adjustment to and pressing on the food to be grilled with a desired pressure, preferably 35–65 grams per cm$^2$, and that the electrode voltage is adjustable from 15–48 V for adjustment to for example 20 V for hamburgers with a thickness of 10 cm.

The invention is illustrated by an embodiment shown as an example in the enclosed drawing.

Figure 1:
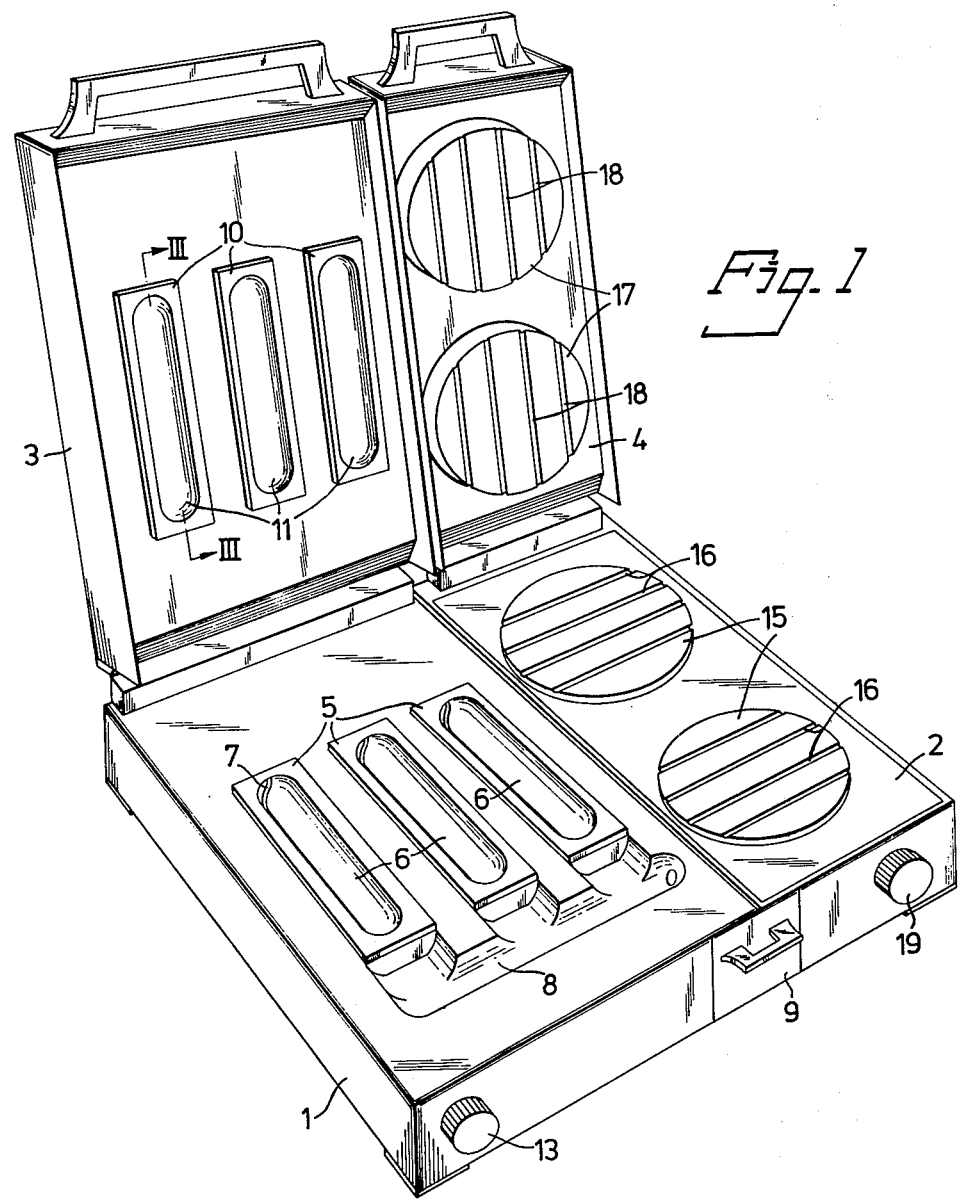
FIG. 1 shows an apparatus according to the invention in perspective and in an open position.
Figure 2:
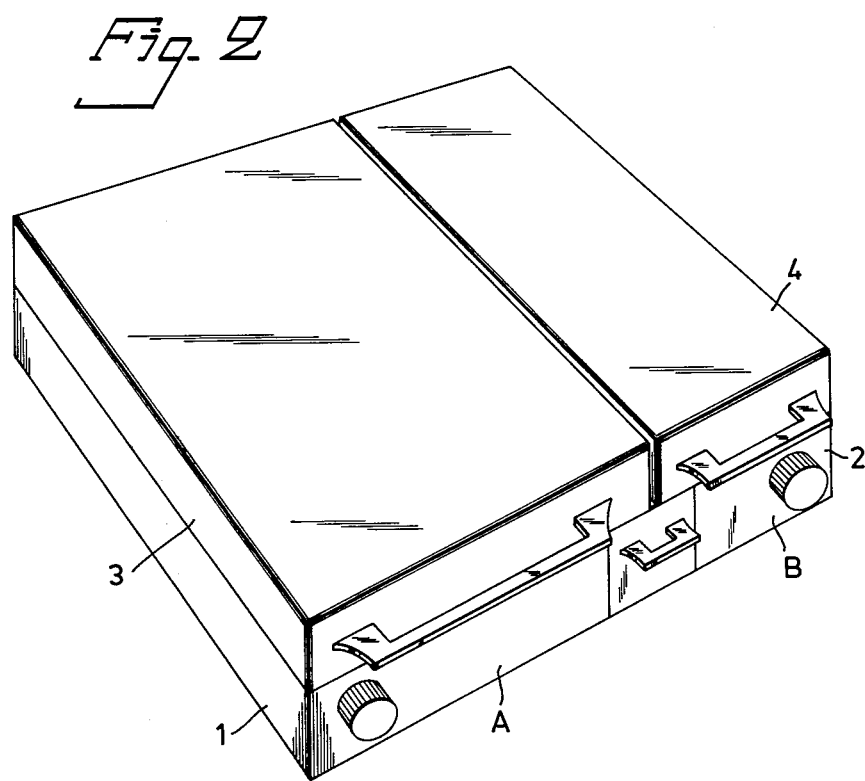
FIG. 2 shows the apparatus of FIG. 1 in perspective and in a closed position.

The apparatus shown in FIGS. 1 and 2 is intended for grilling of both sausages and hamburgers or rissoles and comprises a sausage grill A and a hamburger grill B made as a unit or as separate modules, which can be combined in a arbitrary way according to what is needed, for example a sausage grill and two hamburger grills or other combinations. Each grill A and B comprises a base 1 and 2 respectively and a cover 3 and 4 respectively connected thereto by hinges, which covers can be opened to the position shown in FIG. 1 and closed to the position shown in FIG. 2.

On the base 1 of the sausage grill A there are three suitably arranged electrode plates 5 preferably of cast iron or pig-iron in order to have a good current conduction and so that the food will not tend to stick to it. Each electrode plate 5 is provided with a cavity 6 for a sausage and a drainage groove 7 for grease etc., said groove opening into a channel 8 with an outlet in a collecting box 9 for grease and the like, which box can be drawn out.

Figure 3:
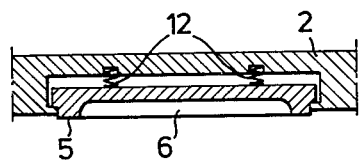
FIG. 3 shows a section at the line III—III in FIG. 1.

The cover 3 is also provided with three electrode plates 10 for cooperation with the first mentioned lower electrode plates 5 and of the same material as the last mentioned plates and with cavities 11. The electrode plates 10 are within certain limits movably mounted in the cover 3, as can be seen schematically in FIG. 3, so that they can individually be adjusted to a sausage, which has been placed on the grill and is lying in the cavities 6, 11 after the cover has been closed, as is shown in FIG. 2. Each electrode plate 10 has a certain weight and can furthermore be influenced by pressure springs 12, indicated in FIG. 3, so that the pressure on the sausage will be for example between 35–65, preferably 50 grams per cm$^2$. At a higher pressure on the sausage there is risk for a movement of water towards the surface and towards the ends of the sausage which may lead to sausages dry inside, which may easily burst, preferably by shrinking where the under and upper electrode plates 5 and 10 respectively meet.

Current is supplied to the electrode plates 5,10 over a (not shown) transformer with stepwise adjustable voltage on the secondary side and which preferably is short-circuit proof. The suitable voltage depends on the thickness of the sausages and will most often be between 15–48 V and should not be more than 48 V due to safety considerations. Further there is provided a timer (not shown) with a control knob 13 for manual time setting and contactors for automatic cutting of the current when the grilling time is out. Means not shown for preventing short-circuit, such as for example a spacing means between the base and the cover, prevents that the lower and upper electrode plates will come into direct contact, if the cover is closed without any pieces of food having been placed on the base.

By the described movable mounting of the electrode plates 9 there is achieved uniform pressure on the sausage by the two plates, and also that the movable plate can follow the movements of the sausage during the grilling, that is first a contraction and then an expansion. If the plate did not follow these movements, an airgap tends to arise during the contraction, in which airgap there will be flash-overs leading to a strong local heating, which in turn leads to bad burn wounds on the food and a tendency for explosion and skin bursting.

In the base 2 of the hamburger grill B there are two preferably fixed electrode plates 15, said plates being plane and having shallow grooves 16 on their surfaces, and preferably being of the same kind of material as the plates 5. The cover 4 is provided with two electrode plates 17 also plane and provided with shallow grooves 18 and of the same material as the plates 15. The upper electrode plates 17 are within certain limits movably mounted in the cover 4 and weight and/or spring loaded like the electrode plates 9, so that they can be individually adjusted to the hamburger or hamburgers, rissoles, slices of sausage etc., which have been placed on the lower plate 15. the pressure on the hamburger for example is 25–50, preferably 37, grams per cm$^2$ depending on the consistency of the forcemeat. If the material is harder, for example due to mixed in flour, the pressure should be higher.

The electric equipment is substantially the same as for the described sausage grill A, and of the equipment only one control knob 19 for manual time setting is shown. The suitable voltage is as mentioned above depending on the thickness of the food to be grilled, and for hamburgers with a thickness of 10 mm the required voltage is about 20 V. For thinner pieces of food, for example slices of sausage, the voltage can be reduced to about 15 V. The advantages described above with movable electrode plates in the sausage grill A are also and often to a higher degree attained with the movable electrode plates of the grill B.

The described apparatus will grill products taken directly from the refrigerator in about 2 minutes. The direct grilling of frozen and thus fresh products and the short exposing time guarantee that the ready grilled product will be very delicate and will look very attractive. The apparatus is very simple and robust and has a hygienic construction. The time setting guarantees a uniform end product and can be manually adjusted to the individual wishes of the customers as regards degree of grilling.

The construction of the apparatus can of course be varied within the scope of the invention. For example the electrode plates of the cover may be fix and the electrode plates of the base may be movable. There may be arranged an adjustable spring pressure on the movable electrode plates and a readable pressure on the food to be grilled.

What we claim is:

1. Apparatus for grilling food such as sausages, hamurgers, rissoles and the like comprising a base and a hinged cover, electrode plates in said base and cover for heating food to be grilled, a source of electric power with adjustable voltage and means connecting said electrode plates in series with said source and with each other whereby current will flow through the food in said electrode plates, said base having a plurality of adjacently situated electrode plates of cast iron fixed thereto, some of said plates having cavities and some having a substantially planar surface arranged so that simultaneous cooking of different types of food is possible, the electrode plates of the cover being the same in number and of the same form as the electrode plates of the base and being individually movably mounted in the cover, said electrode plates being individually weight and/or spring loaded for adjustment to the shape of and for uniformly pressing against the food to be grilled with a pressure of about 35–65 grams per $cm^2$, and electrode voltage adjustment means connected to said source of electric power and to said electrode plates for adjusting the voltage to about from 15–48 V.

2. Apparatus according to claim 1 wherein the plates having cavities and the plates having substantially planar surfaces are, respectively, contained in adjacently connected modules, each of said modules comprising a base and a cover and each module having individual voltage control means whereby the cooking temperatures in of said modules can be independently controlled.

* * * * *